(12) United States Patent
Frost

(10) Patent No.: US 9,958,164 B1
(45) Date of Patent: May 1, 2018

(54) ELECTRONIC MODULATING VALVE

(71) Applicant: Timothy Lee Frost, Chattanooga, TN (US)

(72) Inventor: Timothy Lee Frost, Chattanooga, TN (US)

(73) Assignee: Burner Systems International, Inc., Chattanooga, TN (US)

( * ) Notice: Subject to any disclaimer, the term of this patent is extended or adjusted under 35 U.S.C. 154(b) by 428 days.

(21) Appl. No.: 14/669,844

(22) Filed: Mar. 26, 2015

Related U.S. Application Data

(63) Continuation of application No. 61/986,168, filed on Apr. 30, 2014.

(51) Int. Cl.
*F16K 31/40* (2006.01)
*F24C 3/12* (2006.01)
*F23N 1/00* (2006.01)

(52) U.S. Cl.
CPC .............. *F24C 3/122* (2013.01); *F23N 1/005* (2013.01)

(58) Field of Classification Search
CPC .......... F24C 3/122; F23N 1/005; F16K 31/40; F16K 31/406; F16K 31/408; F16K 31/163; F16K 31/02; F02M 21/02; F02M 21/0233
See application file for complete search history.

(56) References Cited

U.S. PATENT DOCUMENTS

| | | | | |
|---|---|---|---|---|
| 3,360,198 A | * | 12/1967 | Katchka | F23N 1/007 236/80 C |
| 2005/0150555 A1 | * | 7/2005 | James | F16K 1/52 137/599.16 |
| 2007/0125356 A1 | * | 6/2007 | Crnkovich | F24C 3/126 126/39 BA |
| 2010/0199982 A1 | * | 8/2010 | Hansen | A61M 15/009 128/200.21 |
| 2013/0153798 A1 | * | 6/2013 | Kucera | F23N 1/002 251/129.01 |

* cited by examiner

*Primary Examiner* — Alfred Basichas
(74) *Attorney, Agent, or Firm* — Stephen J. Stark; Miller & Martin PLLC

(57) ABSTRACT

An electronic modulating oven valve provides advantages over prior art designs. Additionally, for at least some embodiments, a dual passage valve operating in a modulating manner has been found to be desirable for oven and possibly other applications.

19 Claims, 2 Drawing Sheets

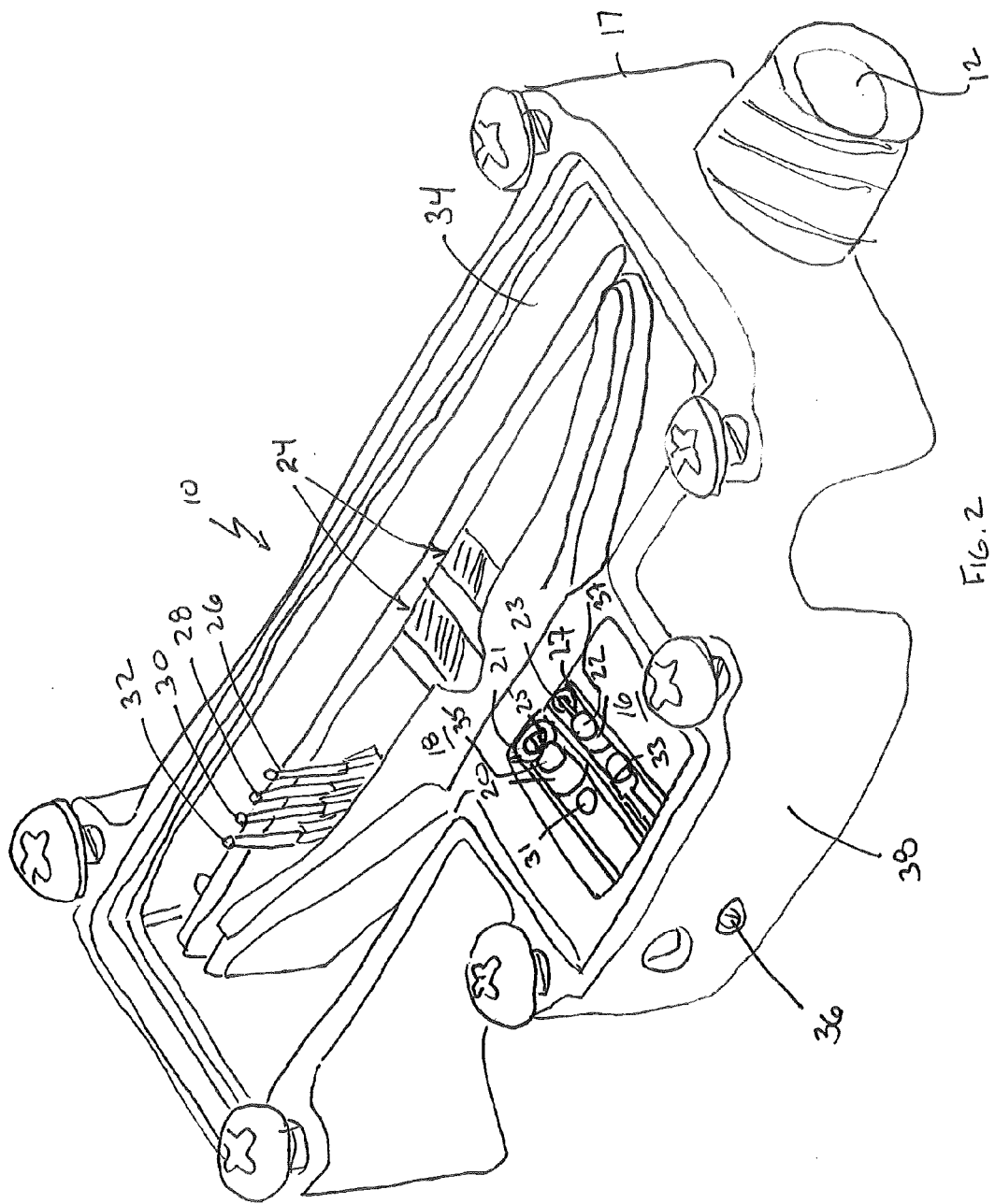

ELECTRONIC MODULATING VALVE

CLAIM OF PRIORITY

This application claims the benefit of U.S. Provisional Patent Application Ser. No. 61/986,168 filed Apr. 30, 2014 which is incorporated herein by reference in its entirety.

FIELD OF THE INVENTION

The present invention relates to an electronic modulating valve for use with gas appliances.

BACKGROUND OF THE INVENTION

Oven valves often cooperate with a very expensive igniter. These two components are normally wired in series. The igniter is high resistance when cold. Its resistance normally drops as it heats up. A bimetallic strip is often utilized to cause the valve to open once reaching significant current flow. Unfortunately, over time, the resistance valves for the igniter and the valve may not align as intended for mechanical valves during normal operation. When out of alignment too much, failure of the oven can occur as the valve does not receive a signal related to a flame burning in the oven. This is a common failure for aging gas ovens. If resistance values change significantly enough that they do not match up, the oven will often fail to operate.

Another common problem with traditional oven valves is they are turned on, then turned off, then turned on, then turn off, etc., in an effort to maintain a desired temperature in the oven. It is believed it would be much more efficient if the oven could stay on and possibly provide a smaller amount of heat such as to offset air flow from the oven, Accordingly, a need is believed to exist lot an improved electronic modulating valve.

There is a manual modulating single flow passage TCTS valve that the applicant provides, however, this is a very expensive valve. Compressing a spring sets the modulation tendencies and then only a single gas flow path is provided through the valve.

Accordingly, there is believed to be a need for an electronic modulating valve which can provide improved performance at a more efficient cost in the market.

SUMMARY OF THE INVENTION

It is an object of many embodiments of the present invention to provide an improved electronic modulating valve for use with ovens.

It is another object of many embodiments of the present invention to provide an improved oven valve.

Accordingly, in accordance with a presently preferred embodiment of the present invention, a dual flow path electronic modulating valve is provided. Specifically, an electronically controlled valve provides dual passages for gas flow. In the preferred embodiment, when the operator turns the oven to 350°, both passages open. As the temperature setting is approached, reached or surpassed, a first passage is turned off or secured while the second passage is left open. The second passage may or may not be smaller than the first passage and may compensate for an expected heat loss from the oven.

A bypass screw may allow the adjustment of fluid flow in the first passage. The bypass screw can also be utilized to adjust the flow from natural gas to propane, and vise versa. In a no current situation to the valve, at least one spring pushes valve seats to closed positions to close off both the first and second passageways. With the application of an appropriate current or other signal such as from a controller, the current may tighten a shape memory alloy wire to pull the spring down to thus open the valve seat to provide gas flow through at least one of the first and second passages.

The actuator utilized by the applicant was taken from an automotive application. One of the two passages was used to inflate a seat cushion while the second passage was used to deflate the cushion.

The valve can be operated so that both passages are closed, both are open or just the bypass passage remain open. This embodiment does not provide a capability of only opening of the non-bypass passageway, but such a feature could exist with other embodiments. There are four electronic connectors shown, however, in some embodiments three could be utilized (such as by sharing a common ground condition). A control circuit (not shown) can communicate with the connectors. The spark igniter (not shown) may be utilized utilizing current technology which may also communicate with the control circuit. A spark may be provided when at least one of the valves are open. A control circuit can have a spark provided with at least one of the valves are open until a flame is present and then stop. If the flame goes out as possibly sensed by a sensor, the igniter can spark again. With just the bypass open, (the second passageway) sustaining the flame could be possible for many embodiments.

BRIEF DESCRIPTION OF THE DRAWINGS

The particular features and advantages of the invention as well as other objects will become apparent from the following description taken in connection with the accompanying drawings in which:

FIG. 2 is a partially cutaway valve as shown in FIG. 1.

DETAILED DESCRIPTION OF THE PREFERRED EMBODIMENT

Figure 1:
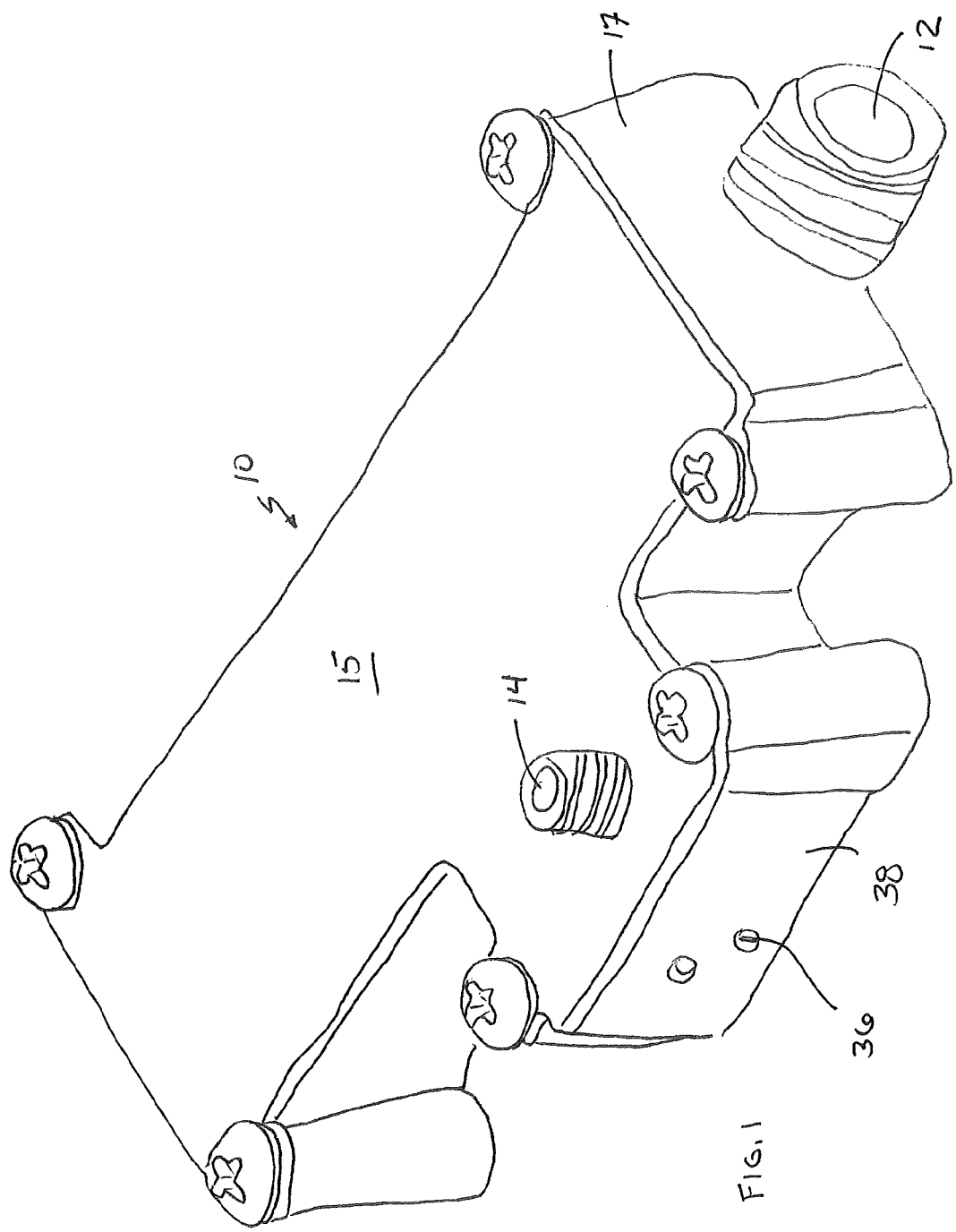
FIG. 1 is a perspective view of a valve in accordance with the presently preferred embodiment of the present invention.

FIG. 1 shows a valve 10 having an inlet 12 and an outlet 14. The outlet 14 is not shown in the structure shown in FIG. 2 but is located above passage 16. Cover 15 of housing 17 shown in FIG. 1 is removed in FIG. 2. As the gas receives through inlet 12, it then encounters one of two passages controlled by actuator 18. Actuator 18 preferably controls the passage of gas through first and second passages 20,22.

Actuator 18 preferably provides a bimetallic operator having two shape memory alloy wires 25,27 each of which pull against the force of one of two springs 24 upon receipt of a signal such as between first wire 26 and ground 28. Second wire 30 may control the opening of bypass or second passage 22 in a similar manner as first wire 26 can control the opening of first passage 20 such as with ground 28 or with ground 32 by moving pistons 21 and 23 relative to bores or passages 20 and 22. Although two grounds 28,32 are illustrated in the illustrated embodiment, a single ground may be utilized with other embodiments.

A processor (not shown) preferably provides signals to control the valve 10. Valve 10 is in communication with a source of gas such as natural gas, propane, etc., at inlet 12. Gas may be held in chamber 34 until at least one of passages 20,22 is opened by receipt of a signal into first of signal wires 26,30 which preferably changes the length of wires 25,27. Upon receipt of an appropriate signal, at least one or both passages are opened. Preferably both passages 20,22 are open allowing gas to pass through parts 31,33 into chamber 16 and out outlet 14, both passages 20,22 are shut or the bypass 22 is open while maintaining the first passage 20 shut for the illustrated embodiment.

Once the first passage 20, if open, and the bypass passage 22 are opened, gas flows through the chamber 16 into the outlet 14. Upon nearing or reaching a set temperature, the first passage 20 can be shut while the bypass passage 22 may be maintained open. Fluid flow through the bypass passage 22 is preferably at least approximately sufficient to maintain a desired temperature by maintaining the desired flow of gas through the outlet 14.

Flow through the bypass passage 22 can be set or adjusted by the use of a set screw 36 or other controller to control the amount of flow through the bypass passage 22 such as to switch between the use of natural gas to propane and vice versa and/or provide other flow adjustments.

By maintaining the bypass passage 22 normally open during normal operation, higher efficiency can be achieved and more consistent temperature can be maintained in an oven. The first passageway 20 can be cycled on and off for step increases in temperature or other effect.

The applicant is unaware of any other attempts to provide an electronic modulating oven valve. The applicant is further unaware of any attempts to provide a dual passage valve that operates in a modulating manner.

During operation, gas from a source 101 proceeds into inlet 12 and then into chamber 34 which, in a preferred embodiment, surrounds a significant portion if not all of actuator 18. In fact, exits from the chamber 34 are the inlet 12 and the passages 20,22. The electrical connections for the signal wires 26,28,30,32 pass through the chamber 34, but do not allow gas to flow in that location. The intentional fluid exits from the chamber 34 are the passages 20,22. The operation of the springs 24 which control pistons or plungers 35,37 is discussed above. When there is no current through the wires 26,28,30,32, the pistons or plungers 35,37 are preferably held by springs 24 (not shown) against valve seats 21,23. Valve seats 21,23 may be formed in the valve 10 such as in main housing 38 or otherwise provide pistons 35,37 of the actuator 18 may provide a gas tight seal against valve seats 21,23 in the closed position as would be understood by those of ordinary skill in the art.

During operation, the bypass or second passage 26 can be maintained open and then the igniter ignited. The igniter may also ignite with both passages 20,22 open. Should the processor 100 sense the flame go out with sensor 102 or otherwise, the igniter 103 may continue to attempt light with at least one of the two passages 20,22 open. It is likely that if the temperature drops a certain amount, that the first passage 20 will open. When reaching a second point relative to a desired temperature, then the first passage 20 will shut off It may be possible that the bypassage or second passage 22 will maintain or will attempt to account for many losses which may be associated with the oven. In this effort, much less cycling of first passage 20 may occur than with single fluid passage valves which completely cycle on and off the oven valves.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A valve comprising:
   a gas inlet and a gas outlet;
   an actuator intermediate the gas inlet and the gas outlet for selectively directing gas from the gas inlet to the gas outlet;
   said actuator having first and second passages in communication with the gas inlet and gas outlet with first and second bores which are respectively transitioned from closed to an open configuration with movement of first and second pistons in the passages; and
   said pistons electrically coupled to a processor, said processor controlling movement of the pistons between the open and closed configurations whereby when in the open configurations the first and second passages communicate the gas inlet with the gas outlet, wherein fluid flowing through the first passage does not flow through the second passage.

2. The valve of claim 1 wherein the pistons are independently moveable between the open and closed configurations by the processor.

3. The valve of claim 1 wherein the actuator is contained within a housing with said gas inlet and gas outlet proceeding therefrom.

4. The valve of claim 3 wherein the actuator separates the housing into at least two compartments: a first compartment in communication with the inlet, a second compartment in communication with the outlet, and wherein the actuator controls flow from first to second compartment within the housing through one or both of the first and second passages.

5. The valve of claim 1 wherein the first and second pistons are spring biased to the closed configurations.

6. The valve of claim 5 further comprising first and second springs in the first and second passages, respectively.

7. The valve of claim 1 wherein the processor directs the first passage to be in the closed configuration upon being provided with an indication that a burner has achieved a first temperature.

8. The valve of claim 7 wherein if an indication is provided to the processor of a drop below a second temperature, said first passage is transitioned from the closed configuration to the open configuration.

9. The valve of claim 1 wherein if the processor senses a flame out condition, the processor sends a signal to an ignitor while maintaining at least one of two passages in the open configuration.

10. The valve of claim 1 further comprising valve seats in the passages and wherein the pistons respectively seal on the valve seats in the closed configuration.

11. The valve of claim 1 further comprising shape memory alloy connected respectively to said pistons whereby when exposed to a predetermined change in an electrical signal, the shape memory alloy expands or contracts to transition from the closed to the open configuration.

12. The valve of claim 11 wherein the piston is moved off of a valve seat when transitioning from the closed to the open configuration.

13. The valve of claim 1 wherein the shape memory alloy overcomes a spring bias to transition from the closed to the open configuration.

14. The valve of claim 1 wherein gas flow through at least one of the first and second passages is adjustable when in the open configuration.

15. The valve of claim 14 wherein the adjustment allows for the transition between propane and natural gas.

16. The valve of claim 1 wherein a set screw adjusts flow through the at least one of the first and second passages.

17. A valve comprising:
- a gas inlet and a gas outlet;
- an actuator intermediate the gas inlet and the gas outlet for selectively directing gas from the gas inlet to the gas outlet;
- said actuator having a first passage with a first piston selectively transitioned from a closed to an open configuration; and
- a processor coupled to the actuator electrically controlling movement of the first piston between the open and closed configurations, and when the first piston is in the open configuration, gas flows from the gas inlet to the gas outlet through the first passage, and
- a second piston and a second passage by passing the first passage for flow from the gas inlet to the gas outlet, with the second piston selectively transitioned from a closed to an open configuration; and wherein the processor coupled to the actuator electrically controls movement of the second piston between the open and closed configurations.

18. The valve of claim 17 wherein the first and second pistons are operably independently of one another by the processor.

19. The valve of claim 17 further comprising a housing with the actuator separating the gas inlet from the gas outlet in the housing.

* * * * *